United States Patent [19]
Kolhatkar

[11] Patent Number: 5,562,559
[45] Date of Patent: Oct. 8, 1996

[54] ROCKER JOINT CHAIN WITH CRESCENT SHAPED APERTURE

[75] Inventor: Shashank C. Kolhatkar, Ithaca, N.Y.

[73] Assignee: Borg-Warner Automotive, Inc., Sterling Heights, Mich.

[21] Appl. No.: 421,813

[22] Filed: Apr. 13, 1995

[51] Int. Cl.$^6$ ................................................ F16G 13/02
[52] U.S. Cl. ........................................ 474/229; 474/230
[58] Field of Search .................................. 474/206, 215, 474/216, 226–230

[56] References Cited

U.S. PATENT DOCUMENTS 5,176,587  1/1993  Mott .................................... 474/216
5,372,554  12/1994  Okuda ................................. 474/215 X

*Primary Examiner*—Roger J. Schoeppel
*Attorney, Agent, or Firm*—Willian Brinks Hofer et al.; Greg Dziegielewski

[57] ABSTRACT

A rocker joint for a power transmission chain constructed of an assembly of links and pivot members including a chain assembly having a plurality of sets of links interleaved with other sets of links. Each link has end portions and a central body portion and a pair of spaced apertures each spaced aperture defining a boundary. The pivot members include a pair of pins, each pin having a circular arc rocker surface, a circular arc seat surface opposite to the rocker surface and concentric with the rocker surface and a pair of side surfaces connecting the rocker surface and the seat surface. The pin side surface includes a circular arc having its center located outside the pin. Each aperture has a circular arc support surface located toward the end portion of the link. The aperture circular arc support surface engages the seat surface of one of the pins. The aperture has a retention surface connected to the circular arc support surface and facing toward the side surface of one of the pins, the retention surface has a center of curvature located outside the boundary defined by the aperture. The aperture also has a curved surface connected to the aperture retention surface.

18 Claims, 4 Drawing Sheets

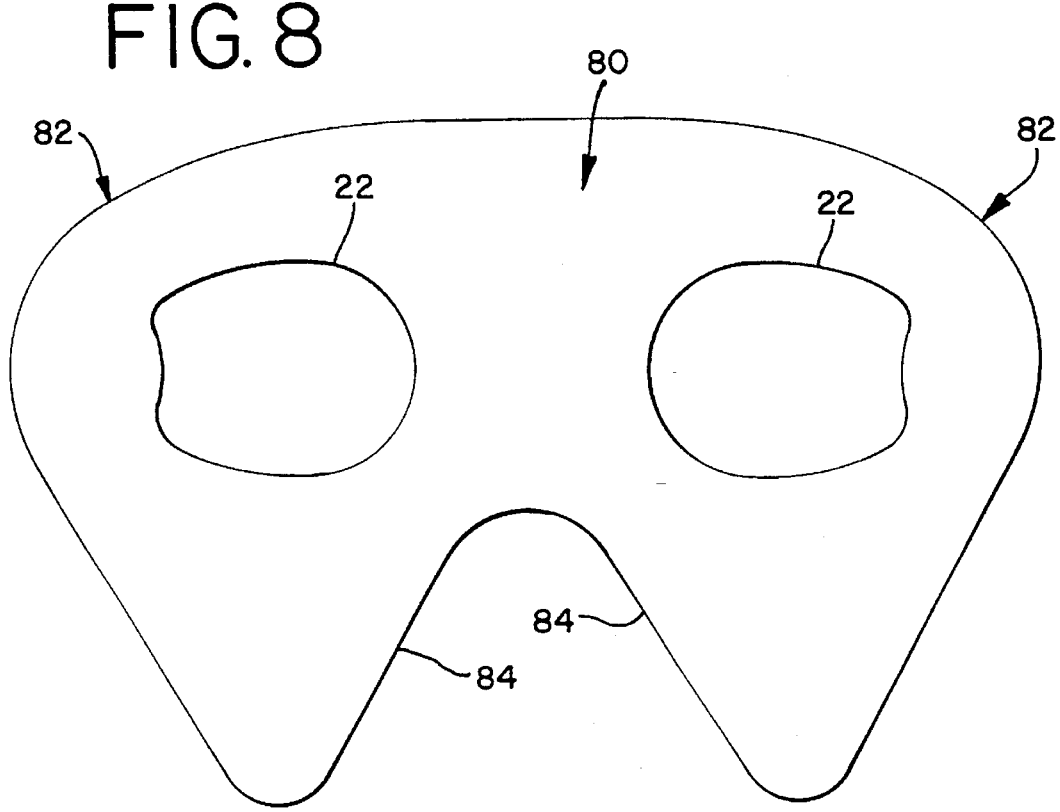
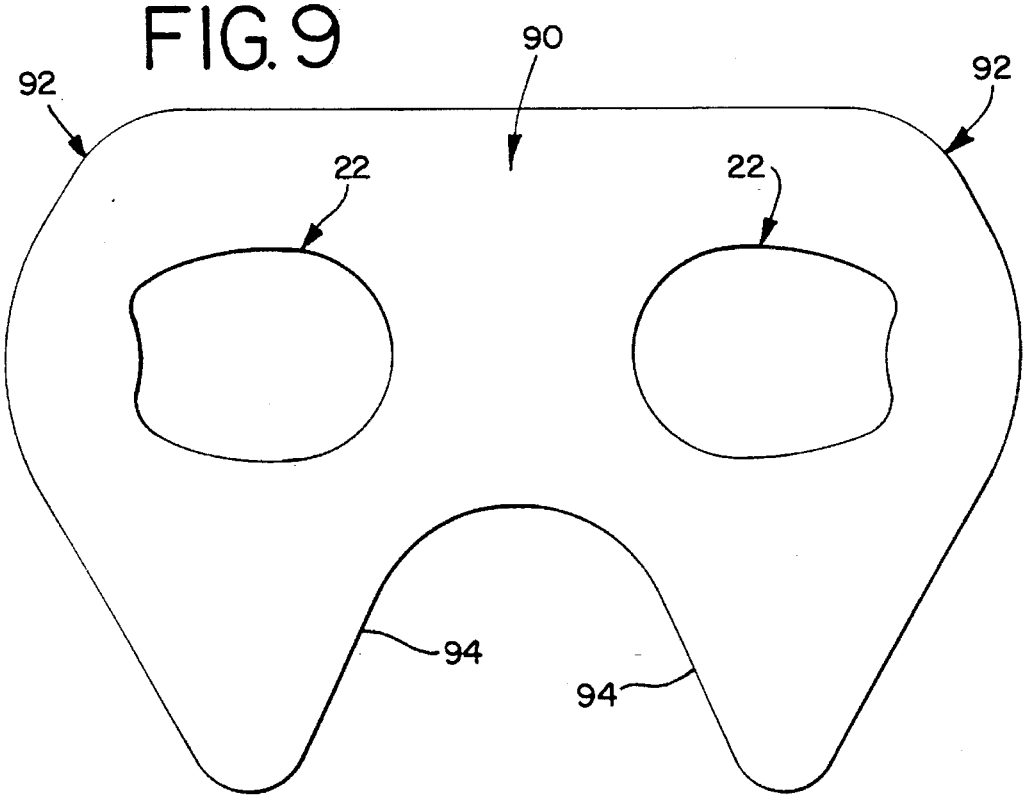

ROCKER JOINT CHAIN WITH CRESCENT SHAPED APERTURE

BACKGROUND OF THE INVENTION

The present invention relates generally to power transmission chains and particularly to an improved rocker joint for such chains. The rocker joint has a crescent shaped aperture and pair of pins. The invention has particular application to power transmission chains of the inverted tooth or silent chain variety, which are used in engine timing applications as well as in the transfer of power from a torque converter to a transmission or in a transfer case of a four-wheel drive vehicle or in vehicle transmissions. The invention also has application to chains of the roller chain variety as well as power transmission chains for use with variable pulley transmissions (continuously variable transmissions).

One type of power transmission chain is referred to as a silent chain. A silent chain is formed of interleaved sets of inverted tooth links which are constructed and arranged to contact the teeth of a sprocket. A set or rank of links is assembled from several links positioned alongside of or adjacent to each other. The links are connected by pivot means, which are typically round pins or rocker joint pins, received in a pair of apertures. Examples of silent chains are shown in U.S. Pat. No. 4,758,210 and U.S. Pat. No. 4,904,231, both of which are incorporated herein by reference.

A second type of power transmission chain is used to transfer power between a pair of variable pulleys in a continuously variable transmission. The chain links are provided in sets that are interleaved together. The links have aligned apertures for receiving pivot means. Load blocks or load carrying means that are positioned on the chain provide the means for transfer of power between the pulleys. An example of a chain suitable for use in a continuously variable transmission is shown in U.S. Pat. No. 4,911,682, which is incorporated herein by reference.

Another type of power transmission chain is known as a roller chain. A typical roller chain consists of alternate inner links and outer links. The inner links, which are also known as "bushing" links, consist of spaced sidebars with bushings tightly received in openings, or apertures, at each end of the sidebars. The outer links, which are also known as "pin" links or guide links, consist of spaced sidebars with pins tightly received in apertures at each end of the sidebars. The bushings freely rotate about the pins to pivotally connect the outer links to the inner links in alternate arrangement. Rollers are mounted for rotation about the bushings. An example of such a roller chain is shown in U.S. Pat. No. 4,186,617, which is incorporated herein by reference.

Silent chains in which a plurality of link plates are joined by rocker joints consisting of a pair of rocker pins have been widely used in prior art. An example of such silent chain is disclosed in the Examined Japan Patent Application 41-2805. In the silent chain disclosed in Application 41-2805, the link plates are provided with apertures at both ends. The apertures have a crescent shape with a convex circular arc support surface. The rocker pins are inserted in the apertures and have a circular arc section with a convex rocker surface and a concave seat surface. The pins are engaged at their seat surface with the aperture support surface. However, since the rocker pin has a circular arc section, the pin section area is relatively small and the chain often ruptures due to the fracture of the pins.

A silent chain in which such fracture of pins is prevented is disclosed in Examined Japan Patent Application 1-55821. In this silent chain, the rocker pins are reinforced by installing a reinforcing plate at the inner surface of the guide link plate. The drawback of this silent chain is that the total width of the chain is increased by the width of the reinforcing plate. The simplest way to prevent such fracture of the pins is to increase the section of rocker pins (to increase the radius of curvature of the rocker surface). In this case, however, the hole becomes large in comparison with the link contour of the link plates, and, consequently, the strength of the link plates decreases.

Another example of the silent chain of the conventional rocker joint type is disclosed in Examined Japan Patent Application 51-1815. In this silent chain, the rocker pins have a nearly trapezoidal cross section of large area. As a result, the strength of pins in such a silent chain is much higher than that in the above-described conventional rocker pins. However, the drawback of this silent chain is that a pair of inclined surfaces, which form a surface stopping the rolling of the rocker pin when load is applied to the chain, make an acute angle. Therefore the tolerance between the inclined surface of rocker pin and the respective inclined surface formed by the aperture in the link plate easily expands in the pitch direction of the chain. For this reason, the manufacture of the chain having a certain pitch becomes a very difficult task.

Another example of the conventional silent chain of the rocker joint type is disclosed in Unexamined Utility Model Application 62-196950. In the silent chain according to this application, the rocker pins have approximately elliptical section, which provides for a higher strength of the rocker pins than in the first of the above-described conventional examples. However, in such silent chain, a protrusion is formed in the aperture of the link plate. The protrusion is used to stop the rotation of rocker pins when the chain is bent. When an impact load is applied to the chain, the protrusion tends to slip, and creates a relative slip between the rocker pin and the link plate and increases the wear of these parts. Moreover, such protrusions cause manufacturing problems because they require difficult machining, accompanied by significant wear of tools.

Another example of a silent chain of the conventional rocker joint-type is disclosed in U.S. Pat. No. 5,372,554, which is incorporated herein by reference. Each of the rocker pins is bounded by a circular arc rocker surface, a circular arc seat surface opposite to this rocker surface and concentric with this rocker surface and a pair of side surfaces connecting the rocker surface and the seat surface. Each pin side surface consists of a circular arc having its center of curvature located within the body of the pin. The pin side surface also includes a substantially plane surface of a slight arc connected to the circular arc. The aperture is bounded by a circular arc support surface located at the end portion of the link plate that engages with the seat surface of one of the rocker pins. The aperture includes a retention surface connected to the support surface and facing the side surface of the rocker pin. The aperture also includes a curved surface connected to the retention surface with sufficient clearance to allow rotation of an adjacent rocker pin. Because of the shape of the rocker pins and apertures the aspect ratio (i.e. ratio of height to width) is lower than the aspect ratio associated with conventional circular rocker pins and apertures. The reduction in aspect ratio leads to an increase in the strength of the chain. However, because the pin side surface has its center of curvature located in the section of the rocker pin at which the seat surface contacts the support surface, the reduction in the aspect ratio is limited.

It is thus desirable to provide apertures and rocker pins with even lower aspect ratios to further increase the strength of the chain.

The present invention relates to a rocker joint for chain. More specifically, in its preferred embodiment, the present invention relates to a silent chain in which tensile strength and wear resistance are increased due to the improvement of the shape of the section of the rocker joint and the shape of the pinhole or aperture in the link plate accommodating this rocker joint.

SUMMARY OF THE INVENTION

The object of the present invention is to increase the strength of the rocker pins and to minimize the elongation of silent chain caused by the chain wear, without decreasing the strength of link plates, by improving the shape of the rocker pins and the shape of the apertures formed in the link plates.

In one embodiment, the present invention relates to a silent chain in which a plurality of link plates having a pair of inverted teeth and a pair of apertures are joined by rocker joints inserted into the apertures. The rocker joint consists of a pair of rocker pins. Each of the rocker pins is bounded by a circular arc rocker surface, a circular arc seat surface opposite to this rocker surface and concentric with this rocker surface, and a pair of side surfaces connecting the rocker surface and the seat surface. Each pin side surface consists of a circular arc having its center of curvature located outside of the rocker pin. The aperture defines a boundary and includes a circular arc support surface located at the end portion of the link plate that engages with the seat surface of one of the rocker pins. The aperture includes a retention surface connected to the support surface and facing the side surface of the rocker pin. The apertures also includes a curved surface connected to the retention surface. The center of curvature of the retention surface is located outside the boundary defined by the aperture.

In a silent chain of the above-described structure, load is transmitted between the link plates and rocker pins mainly by the contact between the support surfaces of link plates and seat surfaces of rocker pins, and positioning of rocker pins with respect to the link plates, and blocking of their relative rotation is performed at these surfaces. According to the present invention, such structure provides for a large pressure-bearing surface, and allows the thickness of the rocker pins to be increased, the rupture strength of the chain to be improved, and the elongation of chain caused by its wear to be minimized. As a result, the strength of the pin is increased and thus the resistance of chain to impact is increased. The strength balance of pins and link plates is improved and therefore a lighter chain having larger load capacity can be obtained. The wear-induced elongation of the chain is also decreased.

BRIEF DESCRIPTION OF THE DRAWINGS

For a more complete understanding of the invention, one should refer to the embodiments illustrated in greater detail in the accompanying drawings and described below by way of examples of the invention in the drawings, which are not to scale:

FIG. 8 is a side view of a link with the aperture of the present invention; and

FIG. 9 is a side view of an alternative link with the aperture of the present invention.

DETAILED DESCRIPTION OF THE DRAWINGS

The present invention is explained below in greater detail with reference to the embodiments illustrated by the attached figures.

Figure 1:
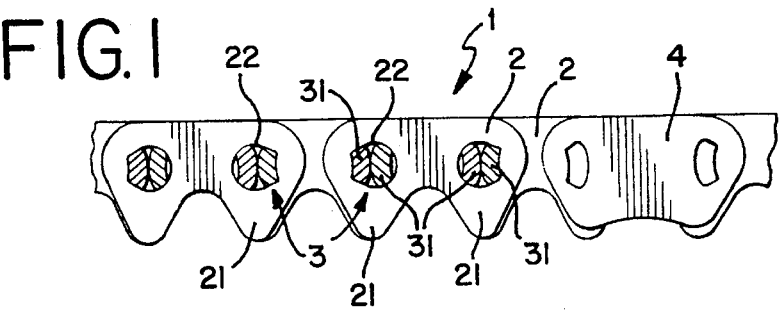
FIG. 1 is a side view illustrating a portion of an embodiment of the silent chain according to the present invention, in partial section.
Figure 2:
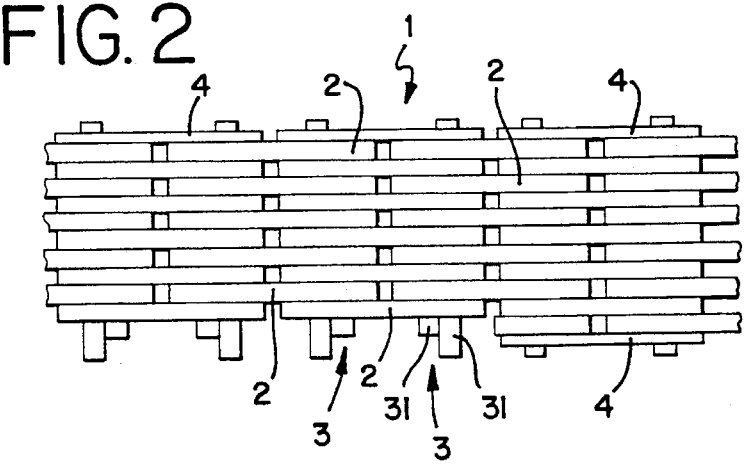
FIG. 2 is a top plan view of the silent chain shown in FIG. 1.

FIG. 1 and FIG. 2 are portions of silent chain 1 according to one embodiment of the present invention. In these figures, link plate 2 has a pair of teeth 21 and a pair apertures or pinholes 22. Rocker joints 3 are inserted into the apertures 22 of the link plates. The rocker joints join a plurality of link plates in the axial direction and permit the interleaved links to pivot. Guide link plates 4 are located outside the row of link plates in the lateral direction. This arrangement is similar to arrangements in the conventional silent chains. A specific feature of the present invention lies in the shape of the apertures provided in the link plates and in the shape of the rocker joints.

Figure 3:
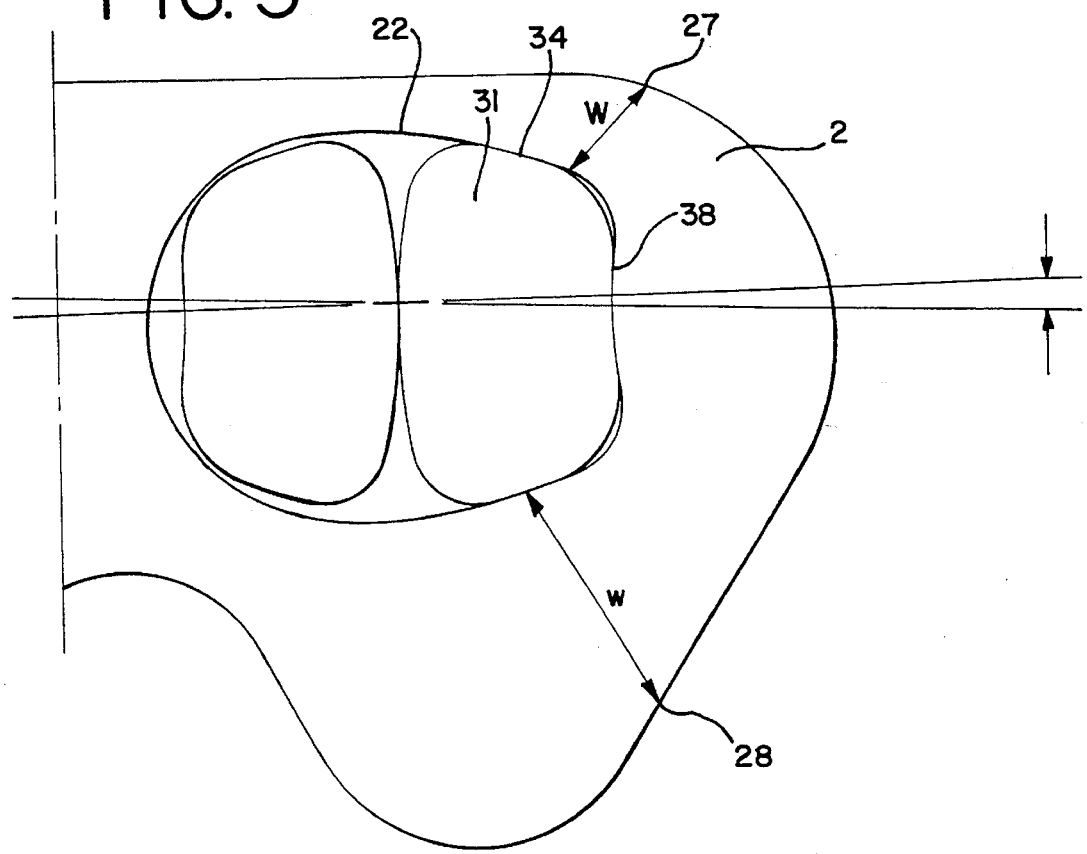
FIG. 3 is a side view illustrating the rocker joint and a portion of the link plate of the silent chain shown in FIG. 1.
Figure 4:
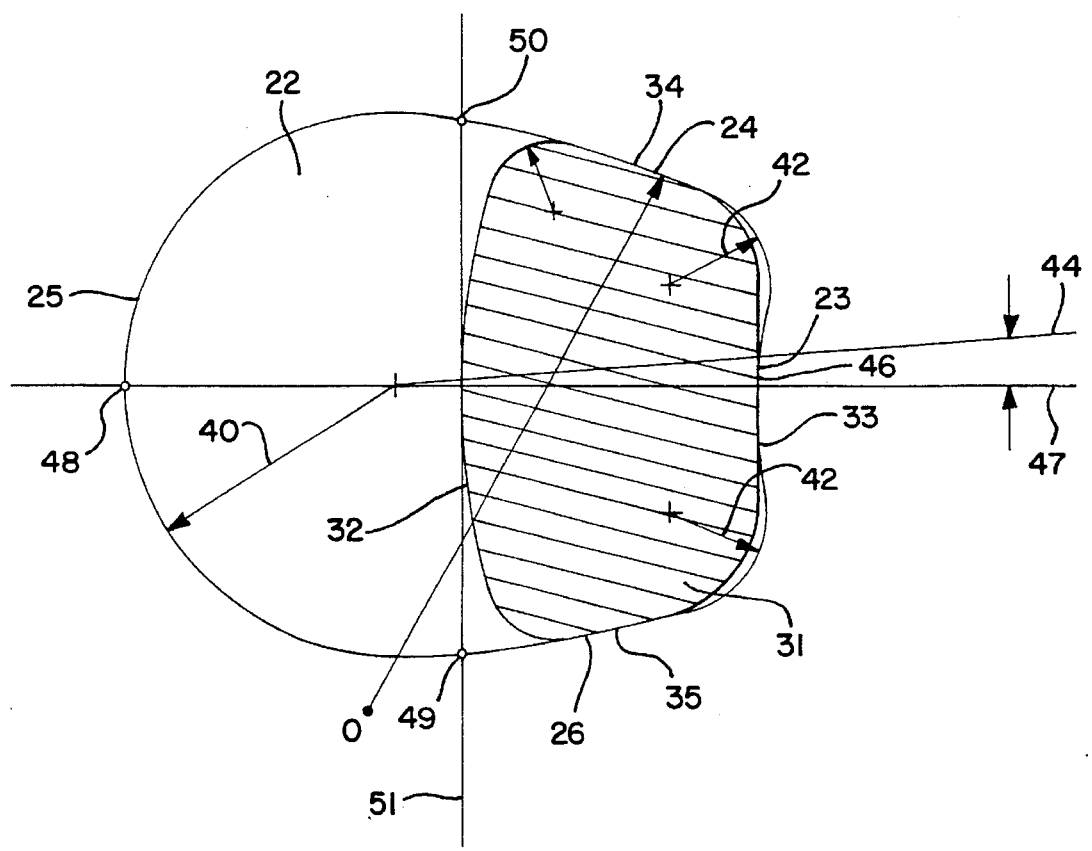
FIG. 4 is a side view illustrating the aperture of the link plate shown in FIG. 3 with only one pin of the rocker joint.
Figure 5:
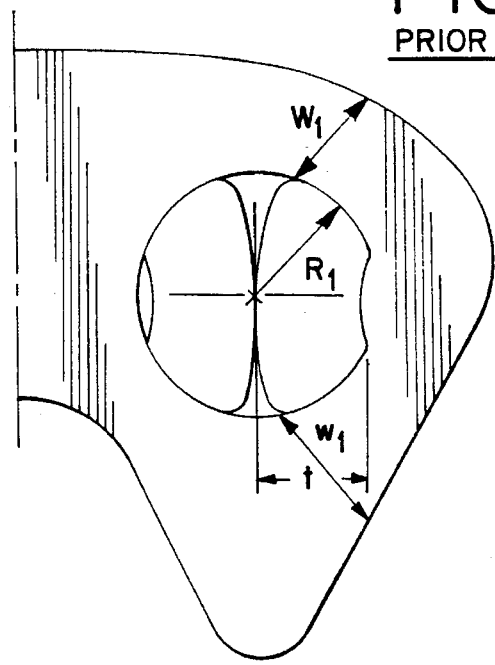
FIG. 5 is a side view of a prior art rocker joint and a half of the link plate illustrating the increase of the rocker joint radius.
Figure 6:
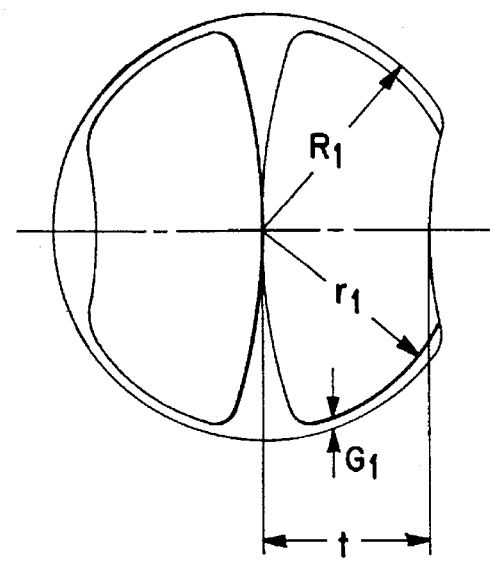
FIG. 6 is a side view illustrating the rocker joint and aperture of the link plate shown in FIG. 5.

FIG. 3 illustrates a portion of link plate 2 and rocker joint according to the present invention on an enlarged scale. FIG. 4 illustrates the aperture and rocker joint shown in FIG. 3 where the aperture is shown with a single pin 31. The second pin of the rocker joint is not shown, but is similar in cross-section to pin 31 and placed in rocking relation in the aperture. In FIGS. 3 and 4, the aperture is wider than the aperture of a prior art link plate having a perfectly round aperture as shown in FIGS. 5 and 6. In particular, aperture 22 of link plate 2 has a irregular oval or crescent shape rather than a perfect round shape. When aperture 22 of link plate 2 and a pair of pins 31 of rocker joint 3 have the shape according to the present invention, which will be described in greater detail hereinafter, the distance from the inner edge of the aperture 22 to the edge 27 of the back portion of link plate, and the distance from the inner edge of aperture 22 to the outside flank 28 of the link plate, are greater than those in the case of a perfectly round aperture of increased radius, as shown in FIG. 5 provided that the thickness of rocker pin 31 is the same. These additional distances result in an increase of the strength of the rocker pin in comparison with the conventional silent chains, without any decrease in the strength of link plates. Thus, in the silent chain according to the present design, the following relations can be obtained: $W>W_1$, $w>w_1$. In these relationships, W is the distance from the inner edge of aperture 22 to edge 27 of the back portion of the link plate, as shown in FIG. 3, and w is the distance from the inner edge of aperture 22 to the outside flank 28 of the link plate. Similarly, $W_1$ is the distance from the inner edge of the aperture 22 to edge 27 of the back portion of the link plate shown in FIG. 5, and $w_1$ is the distance from the inner edge of aperture 22 to the outside flank 28 of the link plate when the radius $R_1$ of the aperture and rocker pin is increased, so as to provide for the same thickness of the rocker pin as shown in FIG. 3.

With particular reference to FIG. 4, the pin 31 includes a circular arc surface 32 and a circular arc seat portion 33, which is located opposite the circular arc surface 32, and preferably concentric with the arc surface. The pin includes a pair of side surfaces 34, 35 which are connected to the circular arc surface 32 and circular arc seat portion 33 by appropriate blend radii. The side surfaces 34, 35 have their center of curvature O located outside of the body of the pin 31. Because the center of curvature O of the pin 31 is located outside the body of the pin its radius is very large compared to pins having their center of curvature located within the pin body. Because the radius of curvature of the side surfaces 34, 35 is relatively large, the side surfaces 34, 35 have a flatter almost planar shape.

The aperture 22 includes a circular arc support surface 23 which is located near the end of the link and provides a surface to engage the seat portion 33 of the pin. A curved surface 25 is located opposite to the circular arc support surface 23. The aperture 22 includes a pair of retention surfaces 24, 26 which are connected to the circular arc support surface 23 by appropriate blend radii. The pair of retention surfaces 24, 26 have substantially the same radius of curvature as the side surfaces 34, 35 of the rocker pin 31. The center of curvature of the pair of retention surfaces 24, 26 is located outside the boundary defined by the aperture. Thus, the pair of retention surfaces 24, 26 are also flatter, almost planar in shape. The curved surface 25 faces the center of the link and is formed by radius 40 located within the aperture boundary.

The aperture 22 is located in the link 2 at a tilt angle 44, which is preferably on the order of less than 5 degrees and more preferably about 4 degrees. The pin seats against the seat surface 23 of the aperture and is located at the same tilt angle as the aperture. Contact between the pin and aperture is made at the circular arc seat portion 33 and the seat surface 23 and the side surfaces 34, 35 and the pair of retention surfaces 24, 26 respectively.

The thickness or length of the aperture is measured from points 46 to 48, along the aperture centerline 47. The height of the aperture is measured from points 49 to 50, along line 51, which is located where the pin rocking surface intersects the centerline 47. Preferably, the aperture thickness is greater than the aperture height. Such a structure allows a thicker pin, which provides a reduced aspect ratio and an increase in tensile strength.

By locating the center of curvature of the side surfaces 34, 35 of the rocker pin 31 outside of the body of the rocker pin 31, the shape of the rocker pin 31 and thus aperture 22 is flatter. In a preferred embodiment, the center of curvature 0 is displaced from the vertical centerline 51. The flatter design reduces the aspect ratio of the rocker pin 31 and aperture 22 and thus increase the strength of the chain. In the case when the silent chain is modified by simply increasing the radius of the rocker pin, as shown in FIGS. 5 and 6 the pin side surfaces have their center within the body of the pin which limits the amount of reduction in aspect ratio. Therefore, the relative movement of rocker pins relative to link plates can be decreased, the wear-induced elongation of chain can be prevented, and the efficiency of stopping the rocker pin can be increased.

Figure 7:
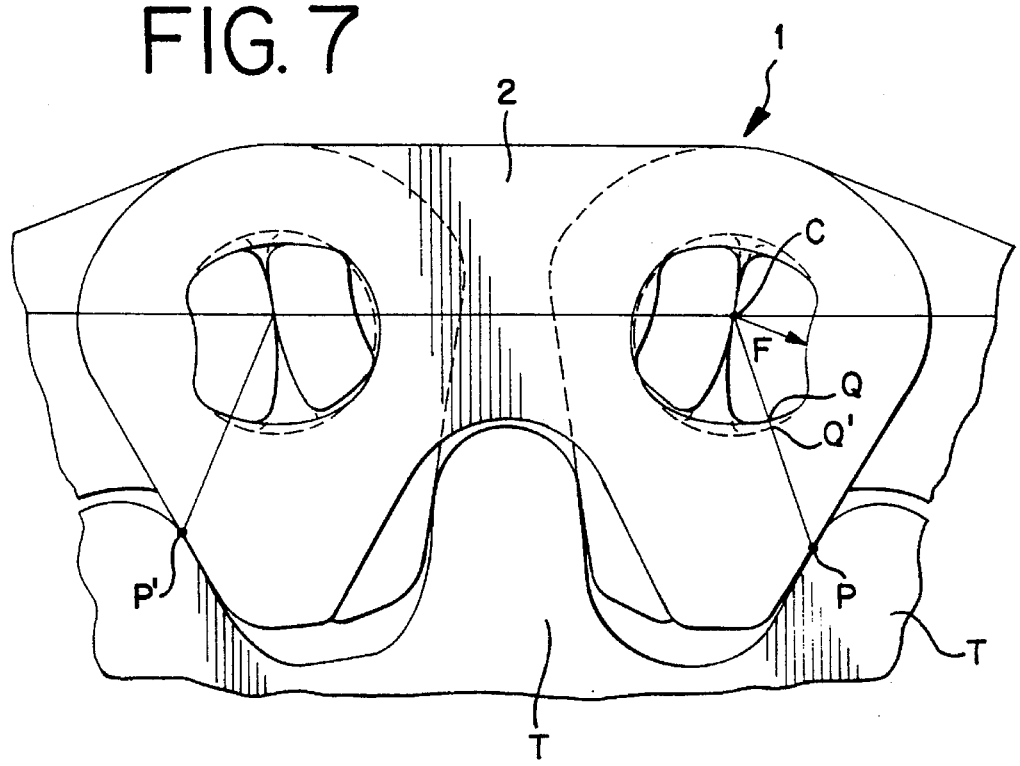
FIG. 7 is a side view illustrating the articulation, of the silent chain with the sprocket.

For reference purposes, FIG. 7 illustrates the case when the silent chain 1 according to the above-described example of the present design is wrapped around a sprocket. As shown in FIG. 7, link plate 2 contacts tooth T of the sprocket in points P, and P' lying on the external flanks. Force F acts on rocker joint 3 in the direction shown by the arrow. Therefore, this force F acts as a compressive force in the direction of the line connecting point P and contact point C of a pair of apertures of rocker joint 3. In the silent chain according to the present design, the distance between point P and position Q at the inner edge of the aperture at the above-mentioned line is greater than the distance between point P and position Q' of the inner edge (shown by broken line) in the event when the aperture is a perfect circle and its radius is increased. For this reason, the bending stresses are decreased and the strength of the link plate is increased corresponding to the above-mentioned difference in distance.

FIGS. 8 and 9 illustrate two links of a silent chain with the aperture 22 of the present invention. The links are of two configurations which are combined in a random or hybrid chain in which links of two configurations are mixed throughout the chain assembly. The link 80 of FIG. 8 has rounded outer edge 82 while the link 90 of FIG. 9 has outer edges 92 of a different or angled configuration. In addition, while both links 80 and 90 have inside flanks 84 and 94 of a first or straight configuration, they may alternatively have a different, or curved configuration as illustrated in FIG. 10 of previously referred to U.S. Pat. No. 5,372,554. An example of a random chain is shown in U.S. Pat. No. 4,342,560, which is incorporated herein by reference.

While several embodiments of the invention have been described, it will be understood that the invention is not limited to those embodiments. Those skilled in the art to which the invention pertains may make modifications and other embodiments employing the principles of this invention, particularly upon considering the foregoing teachings.

What is claimed is:

1. A rocker joint for a power transmission chain constructed of an assembly of links and pivot members, comprising:

a chain assembly having a plurality of sets of links interleaved with other sets of links, each link having end portions and a central body portion and a pair of spaced apertures, said apertures defining a boundary, pivot members including a pair of pins, each of said pins having a circular arc rocker surface, a circular arc seat surface opposite to said rocker surface and concentric with said rocker surface, and a pair of side surfaces connecting said rocker surface and said seat surface, said pin side surface including a circular arc having its center located outside said pin, each of said apertures having a circular arc support surface located toward said end portion of said link, said aperture circular arc support surface engaging said seat surface of one of said pins, said aperture having a retention surface connected to said circular arc support surface and facing toward said side surface of one of said pins, said retention surface having a center of curvature located outside the boundary defined by said aperture, and said aperture having a curved surface connected to said aperture retention surface.

2. The rocker joint of claim 1 wherein said pin side surface includes a plane surface connected to said circular arc.

3. The rocker joint of claim 1 wherein said pin side surface includes a slightly curved surface connected to said circular arc.

4. The rocker joint of claim 1 wherein said center of said pin side surface circular arc is displaced from a vertical centerline through said aperture.

5. The rocker joint of claim 1 wherein said aperture has a thickness and a height, said thickness being greater than said height.

6. The rocker joint of claim 1 wherein each link has a pair of teeth, each tooth having an inside flank having a straight configuration.

7. The rocker joint of claim 1 wherein each link has a pair of teeth, each tooth having an inside flank having a curved configuration.

8. A power transmission chain constructed of an assembly of links and pivot members, comprising:

a chain assembly having sets of guide links inter-leaved with sets of inside links, each link having end portions and a central body portion and a pair of spaced apertures, said apertures defining a boundary, each inside link having a pair teeth depending from said central body portion, pivot members having a pair of pins, each of said pins having a circular arc rocker surface, a circular arc seat surface opposite to said rocker surface and concentric with said rocker surface, and a pair of side surfaces connecting said rocker surface and said seat surface, said side surface including a circular arc having its center located outside said pin, each of said guide link apertures being shaped to match the configuration of said pins, each of said inside link apertures having a circular arc support surface located toward said end portion of said link, said aperture circular arc support surface engaging said seat surface of one of said pins, said inside link apertures having a retention surface connected to said circular arc support surface and facing toward said side surface of one of said pins, said inside link apertures having a curved surface connected to said aperture retention surface, said retention surface having a center of curvature located outside the boundary defined by said aperture.

9. The chain of claim 8 wherein some of said pins being of a length to extend to the width of said inter-leaved sets of links, said some of said pins being press fit in said guide link apertures.

10. The chain of claim 8 wherein said pin side surface includes a plane surface connected to said circular arc.

11. The chain of claim 8 wherein said pin side surface includes a slightly curved surface connected to said circular arc.

12. The chain of claim 8 wherein said center of said pin side surface circular arc is displaced from a vertical centerline through said aperture.

13. The chain of claim 8 wherein said aperture has a thickness and a height, said thickness being greater than said height.

14. The chain of claim 8 wherein said chain includes some sets of inside links having flanks of a first configuration, and other sets of inside links having flanks of a different configuration.

15. A link plate used in the assembly of a power transmission chain comprising:

a body having end portions and a central body portion and a load carrying member extending from said body; and a pair of spaced apertures formed in the end portions of the body, each of said apertures defining a boundary and having a circular arc support surface located toward said end portion of said link, said aperture having a retention surface connected to said circular arc support surface and facing toward said side surface of one of said pins, said aperture having a curved surface connected to said aperture retention surface, said retention surface having a center of curvature located outside the boundary defined by said aperture.

16. The link plate of claim 15 wherein said aperture has a thickness and a height, said thickness being greater than said height.

17. The link plate of claim 15 wherein the radius of curvature of the curved surface increases in a direction away from the retention surface.

18. The link plate of claim 15 wherein the retention surface is connected to the circular arc support surface and the curved surface by appropriate blend radii.

* * * * *